United States Patent
Kavanaugh

(10) Patent No.: US 8,753,558 B2
(45) Date of Patent: Jun. 17, 2014

(54) FORMING SHAPED ABRASIVE PARTICLES

(71) Applicant: Michael D. Kavanaugh, North Grafton, MA (US)

(72) Inventor: Michael D. Kavanaugh, North Grafton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 13/731,771

(22) Filed: Dec. 31, 2012

(65) Prior Publication Data

US 2013/0186005 A1 Jul. 25, 2013

Related U.S. Application Data

(60) Provisional application No. 61/581,846, filed on Dec. 30, 2011.

(51) Int. Cl.
| | | |
|---|---|---|
| B28B 5/02 | (2006.01) | |
| B28B 7/24 | (2006.01) | |
| B28B 13/02 | (2006.01) | |
| B28B 13/06 | (2006.01) | |
| C04B 35/622 | (2006.01) | |
| B28B 5/04 | (2006.01) | |

(52) U.S. Cl.
CPC . *B28B 5/025* (2013.01); *B28B 7/24* (2013.01); *B28B 13/0205* (2013.01); *B28B 13/062* (2013.01); *B28B 2005/048* (2013.01); *C04B 2235/6025* (2013.01)
USPC .......... 264/297.9; 264/297.6; 264/297.7; 264/650; 51/309

(58) Field of Classification Search
None
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |
| 2,049,874 A | 8/1936 | Sherk |
| 2,148,400 A | 2/1939 | Crompton, Jr. |
| 2,248,990 A | 7/1941 | Heany |
| 2,290,877 A | 7/1942 | Heany |
| 2,318,360 A | 5/1943 | Benner et al. |
| 2,563,650 A | 8/1951 | Heinemann et al. |
| 2,880,080 A | 3/1959 | Rankin et al. |
| 3,041,156 A | 6/1962 | Rowse et al. |
| 3,079,242 A | 2/1963 | Glasgow |

(Continued)

FOREIGN PATENT DOCUMENTS

| | | |
|---|---|---|
| CA | 743715 A | 10/1966 |
| CH | 685051 A5 | 3/1995 |

(Continued)

OTHER PUBLICATIONS

"Investigation of Shaped Abrasive Particles vol. 1: Review of US Pat No. 6,054,093 Apr. 25, 2000" © Apr. 2011, 5 pages.

(Continued)

*Primary Examiner* — Benjamin Schiffman
(74) *Attorney, Agent, or Firm* — Mike W. Crosby; Abel Law Group, LLP

(57) ABSTRACT

A method of forming a shaped abrasive particle includes extruding a mixture into an opening in a screen within an application zone and translating the screen and belt to a release zone and separating the screen and belt to form a precursor shaped abrasive particle on the belt, wherein the screen and belt are separated at a release angle of at least about 15° and not greater than about 45°, wherein the release angle is defined as an angle between a surface of the screen and a surface of the belt.

14 Claims, 7 Drawing Sheets

(56) References Cited

U.S. PATENT DOCUMENTS

| | | |
|---|---|---|
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,615,308 A | 10/1971 | Amero |
| 3,619,151 A | 11/1971 | Sheets, Jr. et al. |
| 3,637,360 A | 1/1972 | Ueltz |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |

(56) References Cited

U.S. PATENT DOCUMENTS

| | | |
|---|---|---|
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,486,496 A | 1/1996 | Talbert et al. |
| 5,496,386 A | 3/1996 | Broberg et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,843,815 B1 | 1/2005 | Thurber et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,974,930 B2 | 12/2005 | Jense |
| 7,022,179 B1 | 4/2006 | Dry |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,488,544 B2 | 2/2009 | Schofalvi et al. |
| 7,507,268 B2 | 3/2009 | Rosenflanz |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |

(56) References Cited

U.S. PATENT DOCUMENTS

| | | |
|---|---|---|
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,256,091 B2 | 9/2012 | Duescher |
| 8,480,772 B2 | 7/2013 | Welygan et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0185256 A1 | 8/2006 | Nevoret et al. |
| 2007/0020457 A1 | 1/2007 | Adefris |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0337725 A1 | 12/2013 | Monroe |
| 2014/0000176 A1 | 1/2014 | Moren et al. |

FOREIGN PATENT DOCUMENTS

| | | |
|---|---|---|
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0833803 | 8/2001 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2567784 A1 | 3/2013 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |

(56) References Cited

FOREIGN PATENT DOCUMENTS

| | | |
|---|---|---|
| JP | 2779252 B2 | 7/1998 |
| JP | 10330734 A | 12/1998 |
| JP | 2000091280 A | 3/2000 |
| JP | 03194269 B2 | 7/2001 |
| JP | 2002-038131 A | 2/2002 |
| JP | 73007750 B1 | 8/2002 |
| JP | 2003-049158 A | 2/2003 |
| JP | 2004-510873 A | 4/2004 |
| JP | 2004209624 A | 4/2004 |
| JP | 2006-192540 A | 7/2006 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2006/027593 | 3/2006 |
| WO | 2007/041538 A1 | 4/2007 |
| WO | 2010/077509 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013151745 A1 | 10/2013 |
| WO | 2013/188038 A1 | 12/2013 |

OTHER PUBLICATIONS

Austin, Benson M., "Thick-Film Screen Printing," Solid State Technology, Jun. 1969, pp. 53-58.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., 1999, vol. 14, No. 10, pp. 3907-3912, abstract only.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy, abstract only.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63, abstract only.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.

FORMING SHAPED ABRASIVE PARTICLES

CROSS-REFERENCE TO RELATED APPLICATION(S)

The present application claims priority from U.S. Provisional Patent Application No. 61/581,846, filed Dec. 30, 2011, entitled "FORMED SHAPED ABRASIVE PARTICLES," naming inventor Michael D. Kavanaugh, which application is incorporated by reference herein in its entirety.

BACKGROUND

1. Field of the Disclosure

The following is directed to shaped abrasive particles, and more particularly, to a screen printing process of forming shaped abrasive particles and the resulting particles.

2. Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

SUMMARY

According to one aspect, a method of forming a shaped abrasive particle comprises extruding a mixture into an opening in a screen within an application zone, and translating the screen and belt to a release zone and separating the screen and belt to form a precursor shaped abrasive particle on the belt, wherein the screen and belt are separated at a release angle of at least about 15° and not greater than about 45°, wherein the release angle is defined as an angle between a surface of the screen and a surface of the belt.

In yet another aspect, a method of forming a shaped abrasive particle comprises extruding a mixture through a die opening of a die and into an opening of a screen underlying the die opening within an application zone, and forcing at least a portion of the mixture into the opening while translating the screen under a knife edge integrally formed with a surface of the die.

In still one aspect, a system for forming shaped abrasive particles comprises a die having a reservoir configured to contain a mixture and a die opening configured to pass the mixture therethrough, and a knife edge integrally formed with the die and comprising an erodible material.

According to one particular aspect, a system for forming shaped abrasive particles comprises a die having a die opening, a screen underlying the die opening within an application zone, a belt underlying the screen within the application zone, and a component for altering a release angle between the screen and belt, wherein the release angle is defined as an angle between a surface of the screen and a surface of the belt in a release zone or a radius of release of the belt defined by a curvature of the belt in the release zone.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The systems and methods herein may be utilized for forming shaped abrasive particles. The shaped abrasive particles may be utilized in various applications, including for example coated abrasives, bonded abrasives, free abrasives, and a combination thereof. Various other uses may be derived for the shaped abrasive particles.

Figure 1:
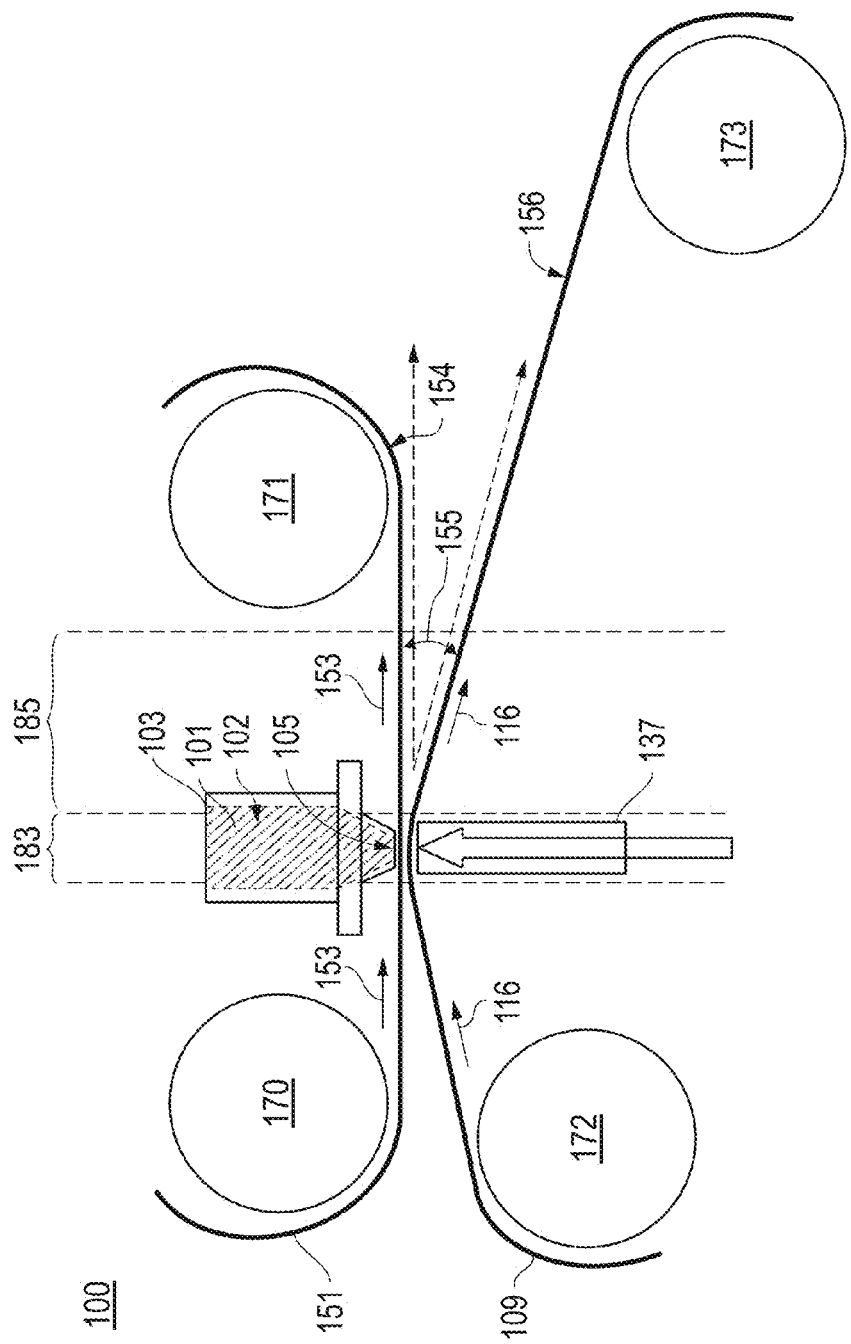
FIG. 1 includes a schematic of a system for forming a shaped abrasive particle in accordance with an embodiment.

FIG. 1 includes an illustration of a system for forming a shaped abrasive particle in accordance with an embodiment. As illustrated, the system 100 can include a screen 151 configured to be translated between rollers 170 and 171. It will be appreciated that the screen 151 can be translated over a greater number of rollers or other devices if so desired. As illustrated, the system 100 can include a belt 109 configured to be translated in a direction 116 over rollers 172 and 173. It will be appreciated that the belt 109 may be translated over a greater number of rollers or other devices if so desired.

As illustrated, the system 100 can further include a die 103 configured to conduct extrusion of a mixture 101 contained within a reservoir 102 of the die 103. The process of forming a shaped abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to hold a given shape even in the green (i.e., unfired) state. In accordance with an embodiment, the gel can be formed of the ceramic powder material as an integrated network of discrete particles.

The mixture 101 can be formed to have a particular content of solid material, such as the ceramic powder material. For example, in one embodiment, the mixture 101 can have a solids content of at least about 25 wt %, such as at least about 35 wt %, or even at least about 42 wt % for the total weight of the mixture 101. Still, in at least one non-limiting embodiment, the solid content of the mixture 101 can be not greater than about 75 wt %, such as not greater than about 70 wt %, not greater than about 65 wt %, or even not greater than about 55 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being Al2O3.H2O and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas such as ATH (aluminum trihydroxide) a common precursor material used herein for the fabrication of boehmite particulate materials.

Furthermore, the mixture 101 can be formed to have a particular content of liquid material. Some suitable liquids may include organic materials, such as water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 60 wt %, or even not greater than about 55 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $1 \times 10^6$ Pa. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the get into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported. The viscosity can be calculated by dividing the storage modulus value by 6.28 s-1.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or even at least about $65 \times 10^3$ Pa s. In at least one non-limiting embodiment, the mixture 101 may have a viscosity of not greater than about $1 \times 10^6$ Pa s, not greater than about $5 \times 10^5$ Pa s, not greater than about $3 \times 10^5$ Pa s, or even not greater than about $2 \times 10^5$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the embodiments herein may utilize a mixture 101 that is distinct from slurries used in conventional tape casting operations. For example, the content of organic materials within the mixture 101, particularly, any of the organic additives noted above may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture 101 can have a pH of less than about 5, and more particularly, within a range between about 2 and about 4, using a nitric acid additive.

Figure 2:
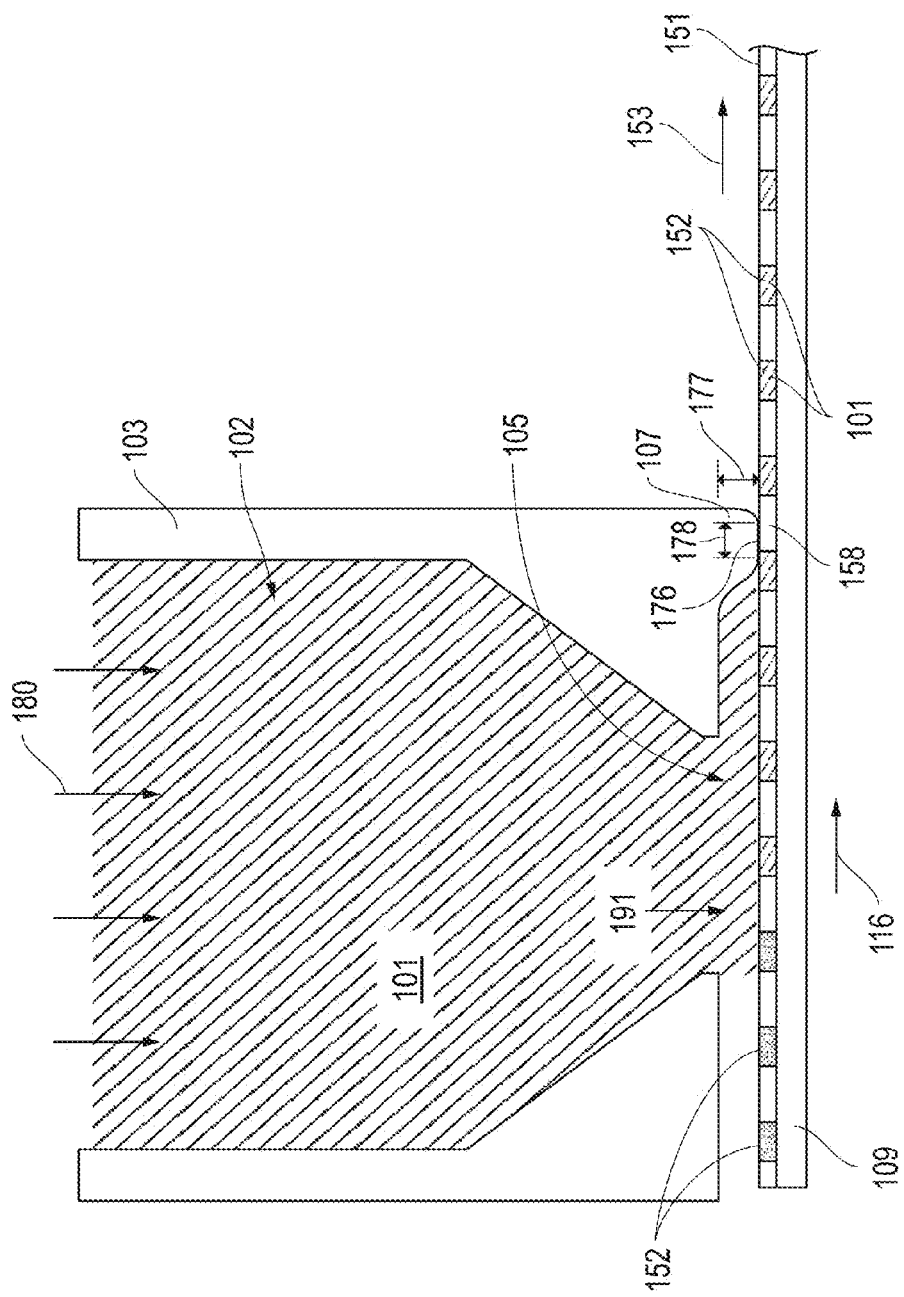
FIG. 2 includes an illustration of a portion of the system of FIG. 1 in accordance with an embodiment.

Referencing FIGS. 1 and 2, the mixture 101 can be provided within the interior of the die 103 and configured to be extruded through a die opening 105 positioned at one end of the die 103. As further illustrated, extruding can include applying a force 180 (or a pressure) on the mixture 101 to facilitate extruding the mixture 101 through the die opening 105. In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above.

In particular instances, the mixture 101 can be extruded through a die opening 105 at the end of the die 103 proximate to the screen 151. In accordance with an embodiment, the screen 151 may be translated in a direction 153 at a particular rate to facilitate suitable processing. Notably, the screen 151 can be translated through the application zone 183 including the die opening 105 to facilitate the formation of precursor shaped abrasive particles. The screen 151 may be translated through the application zone at a rate of at least about 3 cm/s. In other embodiments, the rate of translation of the screen 151 may be greater, such as at least about 4 cm/s, at least about 6 cm/s, at least about 8 cm/s, or even at least about 10 cm/s. Still, in at least one non-limiting embodiment, the screen 151 may be translated in a direction 153 at a rate of not greater than about 5 m/s, such as not greater than about 1 m/s, or even not greater than about 0.5 m/s. It will be appreciated that the screen 151 may be translated at a rate within a range between any of the minimum and maximum values noted above.

Additionally, the belt 109 can be translated in a direction 116 at a particular rate to facilitate suitable processing. For example, the belt 109 can be translated at a rate of at least about 3 cm/s. In other embodiments, the rate of translation of the belt 109 may be greater, such as at least about 4 cm/s, at least about 6 cm/s, at least about 8 cm/s, or even at least about 10 cm/s. Still, in at least one non-limiting embodiment, the belt 109 may be translated in a direction 116 at a rate of not greater than about 5 m/s, such as not greater than about 1 m/s, or even not greater than about 0.5 m/s. It will be appreciated that the belt 109 may be translated at a rate within a range between any of the minimum and maximum values noted above.

In accordance with a particular embodiment, the screen 151 may be translated at a particular rate as compared to the rate of translation of the belt 109. For example, within the application zone 183, the screen 151 may be translated at substantially the same rate of translation of the belt 109. That is, the difference in rate of translation between the screen and the belt may be not greater than about 5%, such as not greater than about 3%, or even not greater than about 1% based on the rate of the translation of the screen 151.

As illustrated, the system 100 can include an application zone 183, including the die opening 105 of the die 103. Within the application zone 183, the mixture 101 may be extruded from the die 103 and directly onto the screen 151. More particularly, a portion of the mixture 101 may be extruded from the die opening 105, and further extruded through one or more openings in the screen 151 and onto the underlying belt 109.

Figure 5:
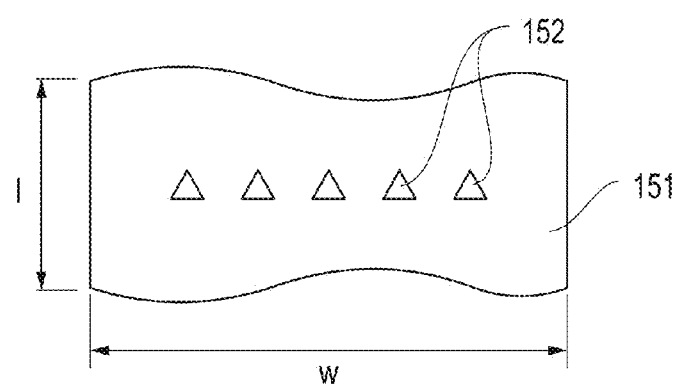
FIG. 5 includes a portion of a screen according to an embodiment.

Referring briefly to FIG. 5, a portion of a screen 151 is illustrated. As shown, the screen 151 can include an opening 152, and more particularly, a plurality of openings 152. The openings can extend through the volume of the screen 151, to facilitate passable of the mixture 101 through the openings and onto the belt 109. In accordance with an embodiment, the openings 152 can have a two-dimensional shape as viewed in a plane defined by the length (l) and width (w) of the screen. While the openings 152 are illustrated as having a triangular two-dimensional shape, other shapes are contemplated. For example, the openings 152 can have a two-dimensional shape such as polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as, a triangle, a rectangle, a quadrilateral, a pentagon, a hexagon, a heptagon, an octagon, a nonagon, a decagon, and a combination thereof. Moreover, a screen 151 can be formed to include a combination of openings 152 having a plurality of different two-dimensional shapes.

Referring again to FIG. 1, after forcing the mixture 101 through the die opening 105 and a portion of the mixture 101 through the openings 152 in the screen 151, precursor shaped abrasive particles 153 may be printed on a belt 109 disposed under the screen 151. According to a particular embodiment, the precursor shaped abrasive particles 153 can have a shape substantially replicating the shape of the openings 152.

After extruding the mixture 101 into the openings 152 of the screen 151, the belt 109 and screen 151 may be translated to a release zone 185, wherein the belt 109 and screen 151 can be separated to facilitate the formation of precursor shaped abrasive particles. In accordance with an embodiment, the screen 151 and belt 109 may be separated from each other within the release zone 185 at a particular release angle 155. In accordance with specific embodiment, the release angle 155 can be a measure of the angle between a lower surface 154 of the screen 151 and an upper surface 156 of the belt 109.

In accordance with an embodiment, the release angle 155 may be particularly controlled to facilitate suitable formation of shaped abrasive particles. For example, in accordance with an embodiment, the release angle can be at least about 15° and not greater than about 45°. In more particular instances, the release angle 155 may be at least about 18°, such as at least about 20°, at least about 22°, at least about 24°, or even at least about 26°. Still, however the release angle may be not greater than about 42°, such as not greater than about 40°, not greater than about 38°, or even not greater than about 36°. It will be appreciated that the release angle can be within a range between any of the minimum and maximum values noted above.

Notably, the mixture 101 can be forced through the screen 151 in rapid fashion, such that the average residence time of the mixture 101 within the openings 152 can be less than about 2 minutes, less than about 1 minute, less than about 40 second, or even less than about 20 seconds. In particular non-limiting embodiments, the mixture 101 may be substantially unaltered during printing as it travels through the screen openings 152, thus experiencing no change in the amount of components, and may experience no appreciable drying in the openings 152 of the screen 151.

FIG. 2 includes an illustration of a portion of a system of FIG. 1 in accordance with an embodiment. As illustrated, the system 200 can include a die 103 having a reservoir 102 containing a mixture 101. In accordance with an embodiment, during processing the mixture 101 can be placed under pressure in a direction 180 to facilitate extrusion of the mixture 101 through the die opening 105 in a direction 191. In accordance with an embodiment, the screen 151 can be translated in a direction 153 that is angled relative to the direction of extrusion 191. As illustrated, the angle between the directions of translation 153 of the screen 151 and the direction of extrusion 191 can be substantially orthogonal (90°). However, in other embodiments, the angle may be different, such as acute, or alternatively, obtuse.

As further illustrated, the belt 109 underlying the screen 151 can be translated in a particular direction 116 relative to the direction of extrusion 191. According to one embodiment herein, the belt 109 can be translated in a direction to cause an angle between the direction of translation 116 and the direction of extrusion 191 including any of those embodiments noted above with regard to the screen 151.

As further illustrated, during extrusion within the application zone 183 the screen 151 can be in direct contact with a portion of the belt 109. Furthermore, during extrusion within the application zone 183 the mixture 101 can be extruded through the die opening 105 and may be forced into openings 152 within the screen 151 via a knife edge 107. The die 103 can have a knife edge 107 integrally formed with the body of the die 103. In particular instances, the knife edge 107 can be positioned on the die 103 to facilitate engaging the mixture 101 upon extrusion from the die opening 105. According to one embodiment, the knife edge 107 can be positioned such that it is configured to engage an upper surface 158 of the screen 151. Accordingly, during extrusion, the mixture 101 can be forced into the openings 152 of the screen 151 via the knife edge 107.

In particular instances, the knife edge 107 may be integrally formed with the die 103. As such, the knife edge 107 may be made of a same material as a material of the die 103. In other embodiments, the knife edge 107 may be made of a different material as compared to the material of the die 103.

In accordance with an embodiment, the knife edge 107 can facilitate an initial a balancing of forces between the knife edge 107 and screen 151, and therefore, facilitating suitable processing parameters. The knife edge 107 may be configured to wear away during use such that forces are balanced in the system 100. In more particular instances, the knife edge 107 is formed such that at least a portion of the surface of the knife edge 107 can wear away while in contact with the screen 151.

The knife edge may include an erodible surface, and more particularly a surface in contact with the upper surface 158 of the screen 151. The use of a knife edge 107 including an erodible material, and more particularly, an erodible material in contact with the screen 151, can facilitate a suitable wearing of the knife edge 107 during processing. Some suitable materials for the knife edge 107 can include polymer materials. More particularly, the polymer material may be a fluorinated polymer, such as polytetrafluoroethylene (PTFE). In accordance with an embodiment, the knife edge 107 may consist essentially of PTFE.

As further illustrated, the knife edge 107 may be formed with particular dimensions. For example, the knife edge 107 can extend for a height of at least about 0.5 mm, such as at least about 1 mm, or even at least about 2 mm.

Furthermore, the knife edge 107 may be formed to have a particular contact surface 176. The contact surface 176 may be a region of the knife edge 107 that has worn flat from contacting the screen 141, and can have a substantially planar contour. Moreover, the contact surface 176 may have a particular dimension to facilitate the processing and formation of shaped abrasive particles according to embodiments herein. For example, the contact surface 176 can have a width 178 of at least about 0.01 mm, such as at least about 0.05 mm, at least about 0.08 mm, at least about 0.1 mm, at least about 0.4 mm, at least about 0.8 mm, or even at least about 1 mm. Still, the width 178 of the contact surface 176 of the knife edge 107 may be not greater than about 20 mm, such as not greater than about 10 mm, or even not greater than about 3 mm. It will be appreciated that the width 178 of the contact surface 176 can be within a range between any of the minimum and maximum values noted above.

As further illustrated, the mixture 101 can be extruded through the die opening 105 and forced into openings 152 in the screen 151 via the knife edge 107. As the screen 151 is translated into the application zone the openings 152 in the screen 151 may be substantially open and unfilled. However, after the screen 151 passes under the die opening 105 and knife edge 107, the openings 152 can be filled with the mixture 101. As will be appreciated, upon separation of the screen 151 from the belt 109, the mixture 101 within the openings 152 may be retained on the belt 109 thus resulting in formation of the precursor shaped abrasive particles.

Figure 3:
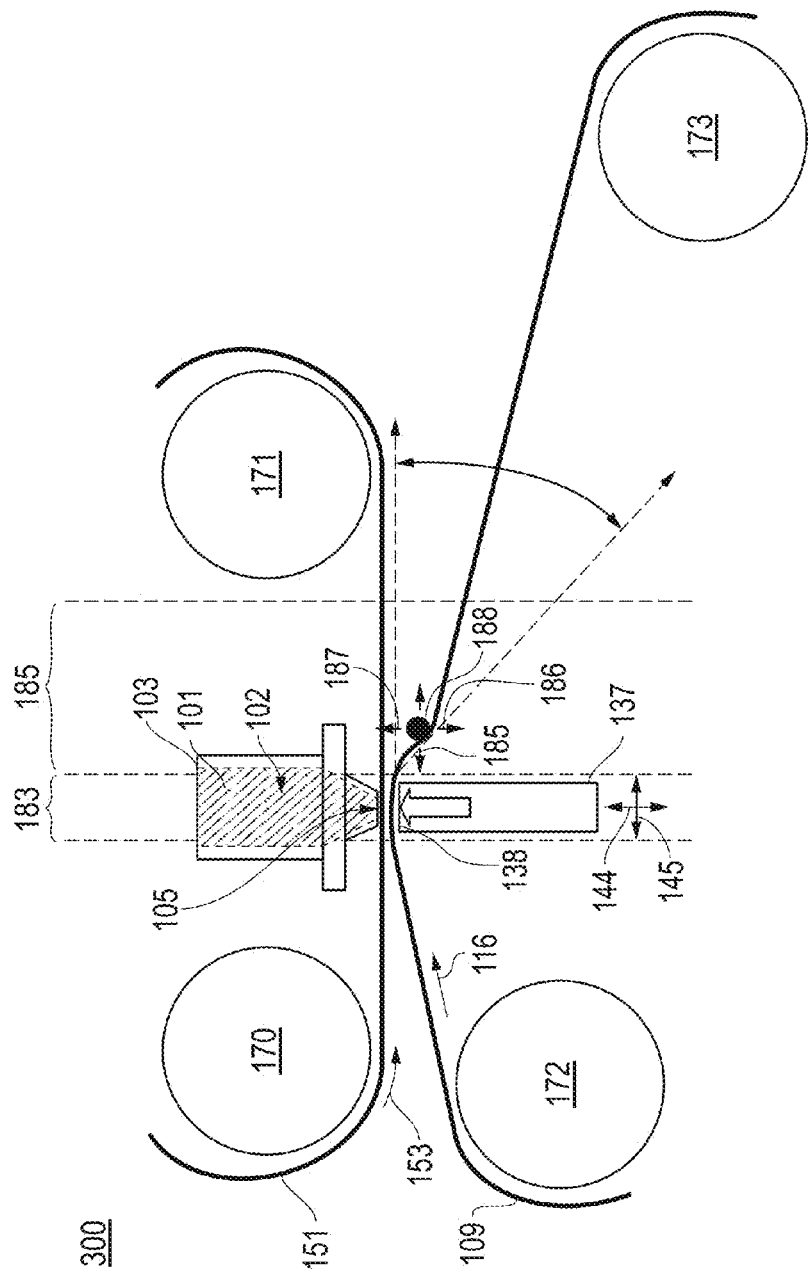
FIG. 3 includes an illustration of a system for forming a shaped abrasive particle in accordance with an embodiment.

FIG. 3 includes an illustration of a system for forming a shaped abrasive particle in accordance with an embodiment. As illustrated, the system can include an application zone 183 including a die 103, wherein a mixture 101 may be applied to a screen 151 and a belt 109. As further illustrated, the system 300 can include a directional adapter 186 positioned within the release zone 185. The directional adapter 186 can be configured to contact a surface of the belt 109 and may change a position of the belt 109 relative to the screen 151. In certain instances, the directional adapter 186 can contact an upper surface 156 of the belt 109. According to one embodiment, the directional adapter 186 can be actuated and moved between at least a first position and a second position within the release zone 185. Notably, the directional adapter 186 may be actuated by a user. Alternatively, the directional adapter 186 may be computer controlled and set to adjust a path of the belt 109 depending upon user parameters.

In accordance with an embodiment, the directional adapter 186 can be moved in various directions, including laterally in the direction 188, vertically in a direction 187, and a combination thereof. The directional adapter 186 may be moved into various positions to adjust the path of the belt 109. Adjusting the path of the belt can be used to facilitate altering the release angle 155 between the screen 151 and belt 109. Furthermore, the directional adapter 186 may be moved between at least a first position and a second position to alter a radius of release. The radius of release can be defined by a curvature of the belt 109 within the release zone 185. The radius of release will be described in more detail herein.

As further illustrated, the system 300 can include a table 137 positioned within the application zone 183. As illustrated, the belt 109 can extend over the table 103 within the application zone 183, and more particularly, may directly contact a surface 138 of the table 137 within the application zone 183. In accordance with an embodiment, the table 137 may be movable to facilitate altering processing conditions of the system 300, and notably, altering a relationship between the screen 151 and belt 109. According to one embodiment, the table 137 can be moved by a user, or alternatively, may be computer controlled and moved according to user parameters.

In accordance with an embodiment, the table 137 can be moveable between at least a first position and a second position. For example, the table 137 can be moved in a lateral direction 145, a vertical direction 144, and a combination thereof. As such, in certain instances, the table 137 can be moved to change the vertical position of the belt 109 within the application zone 183. Alternatively, the table 137 may also be moved between a first position and a second position to facilitate changing a horizontal position of the belt 109 within the application zone 183. As such, the table 137 may be actuated to facilitate control and altering of a release angle 155 between the screen 151 and belt 109. Alternatively, and furthermore, the table 137 may be moved to facilitate altering a release radius of the belt 109.

Figure 4:
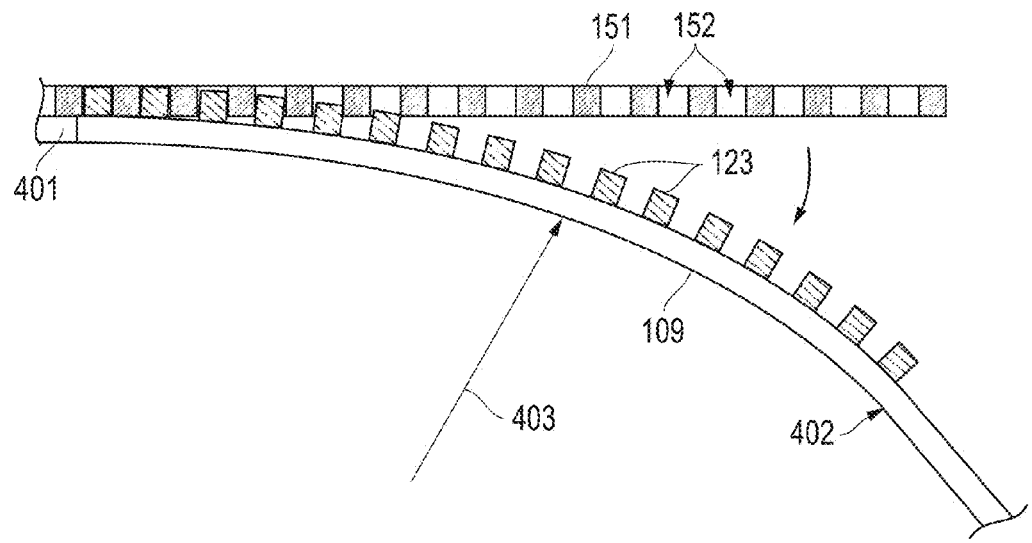
FIG. 4 includes an illustration of a portion of a system for forming a shaped abrasive particle in accordance with an embodiment.

FIG. 4 includes an illustration of a portion of a system for forming a shaped abrasive particle in accordance with an embodiment. As illustrated, the system can include a screen 151 and belt 109 underlying the screen 151. As further illustrated, the belt 109 is being released from the screen 151 within the release zone 185 to facilitate release of precursor shaped abrasive particles 123 from openings 152 within the screen 151 and suitable shaping of the resulting shaped abrasive particles. In particular embodiments, the belt 109 can be separated from the screen 151 at a particular radius 403 that defines the radius of curvature of the belt 109 as measured by the arc of the belt between points 401 and 402. It will be appreciated that the points 401 and 402 define points at which the belt extends on a linear path no longer defining the radius of curvature 403. In accordance with an embodiment, the belt 109 within the release zone can have a radius of release 403 that is not greater than about 6 inches. In other embodiments, the radius of release 403 can be less, such as not greater than about 5.8 inches, not greater than about 5.4 inches, not greater than about 4.8 inches, not greater than about 4.4 inches, not greater than about 4 inches, not greater than about 3.8 inches, not greater than about 3.4 inches, not greater than about 3 inches, not greater than about 2.8 inches, or even not greater than about 2.4 inches. Still, in at least one non-limiting embodiment, the belt 109 can have a radius of release 403 that is at least 0.2 inches, such as at least about 0.5 inches, at least about 0.8 inches or even at least about 1 inch. It will be appreciated that the radius of release 403 of the belt 109 can be within a range between any of the minimum and maximum values noted above.

As will be appreciated, after releasing the screen 151 and the belt 109 from each other, the precursor shaped abrasive particles 123 can be translated along the belt 109 for further processing. It will be appreciated that further processing can include shaping, applying a dopant material, drying, sintering, and the like. In fact, the precursor shaped abrasive particles 123 may be translated through a shaping zone, wherein at least one exterior surface of the particles may be shaped. Shaping can include altering a contour of the precursor shaped abrasive particles 123 through one or more processes, such as, embossing, rolling, cutting, engraving, patterning, stretching, twisting, and a combination thereof. In one particular embodiment, the process of shaping can include contacting a shaping structure, having a particular texture to an exterior surface of the precursor shaped abrasive particles 123 to impart the texture to the exterior surface of the particle. It will be appreciated that the shaping structure can take various forms, including for example, a roller having various features on its surface.

Additionally, the precursor shaped abrasive particles 123 may be translated through an application zone 131 wherein a dopant material can be applied to at least one exterior surface of the particles. Within the application zone 131 a dopant material may be applied utilizing various methods including for example, spraying, dipping, depositing, impregnating, transferring, punching, cutting, pressing, crushing, and any combination thereof. In particular instances, the application zone may utilize a spray nozzle, or a combination of spray nozzles to spray dopant material onto the precursor shaped abrasive particles 123.

In accordance with an embodiment, applying a dopant material can include the application of a particular material, such as a salt, which can be a precursor salt material that includes a dopant material to be incorporated into the finally-formed shaped abrasive particles. For example, the metal salt can include an element or compound that is the dopant material. It will be appreciated that the salt material may be in liquid form, such as in a dispersion comprising the salt and liquid carrier. The salt may include nitrogen, and more particularly, can include a nitrate. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

And further, the precursor shaped abrasive particles 123 may be translated on the belt 109 through a post-forming zone 125. Various processes may be conducted in the post-forming zone 125, including for example, heating, curing, vibration, impregnation, doping, and a combination thereof. In one embodiment, the post-forming zone 125 includes a heating process, wherein the precursor shaped abrasive particles 123 may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above.

After the precursor shaped abrasive particles 123 are translated through the post-forming zone 125, the particles may be removed from the belt 109. The precursor shaped abrasive particles 123 may be collected in a bin 127 for further processing.

In accordance with an embodiment, the process of forming shaped abrasive particles may further comprise a sintering process. For certain processes, sintering can be conducted after collecting the precursor shaped abrasive particles 123 from the belt 109. Alternatively, the sintering may be a process that is conducted while the precursor shaped abrasive particles 123 are on the belt. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina is formed. In one instance, a shaped abrasive particle can comprise at least about 90 wt % alpha alumina for the total weight of the particle. In other instances, the content of alpha alumina may be greater, such that the shaped abrasive particle may consist essentially of alpha alumina.

Furthermore, additional processes such as cleaning may be undertaken on the screen, to facilitate regular and repetitive processing. For example, cleaning may be conducted on the screen after extruding the mixture, and more particularly cleaning the openings 152 of the screen 151 after translating the screen 151 through the release zone 185.

Additionally, the belt 109 may undergo further processes to facilitate efficiency of processing. For example, the belt 109 may undergo a drying process after extruding the mixture, and more particularly, after translating the belt 109 through the release zone 185. Additionally, the belt 109 may be cleaned such that it is ready for continuous use. In accordance with an embodiment, the belt 109 may undergo cleaning after the extrusion process, and more particularly, after separation from the screen 151 within the release zone 185. Notably, cleaning of the belt 109 can be conducted after the precursor shaped abrasive particles 123 are released and removed from the belt 109.

The shaped abrasive particles of embodiments herein can have a particular size, as measured by the length of the body. For example, the shaped abrasive particles may have a median particle size of not greater than about 5 mm. Alternatively, the median particle may be less, such as not greater than about 4 mm, not greater than about 3 mm, not greater than about 2 mm, or even not greater than about 1.5 mm. In still another aspect, the median particle size of the shaped abrasive particles can be at least about 10 microns, at least about 100 microns, at least about 200 microns, at least about 400 microns, at least about 600 microns, or even at least about 800 microns. It will be appreciated that the median particle size of the shaped abrasive particles can be within a range between any of the above minimum and maximum values.

The shaped abrasive particles of embodiments herein can have a particular grain size, particularly for grains of alpha alumina. For example, the shaped abrasive particles may have an average grain size of not greater than about 500 microns, such as not greater than about 250 microns, or even not greater than about 100 microns, not greater than about 50 microns, not greater than about 20 microns, or even not greater than about 1 micron. In another aspect, the average grain size can be at least about 0.01 microns, such as at least about 0.05 microns, at least about 0.08 microns, or even at least about 0.1 microns. It will be appreciated that the average grain size of the shaped abrasive particles can be within a range between any of the above minimum and maximum values.

The shaped abrasive particles of the embodiments herein may include a dopant material, which can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, and a combination thereof.

In certain instances, the shaped abrasive particles can be formed to have a specific content of dopant material. For example, the body of a shaped abrasive particle may include not greater than about 12 wt % for the total weight of the body. In other instances, the amount of dopant material can be less, such as not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body. In at least one non-limiting embodiment, the amount of dopant material can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body. It will be appreciated that the amount of dopant material within the body of the shaped abrasive particle can be within a range between any of the minimum or maximum percentages noted above.

FIG. 5A includes a perspective view illustration of a shaped abrasive particle in accordance with an embodiment. The shaped abrasive particles of the embodiments herein can have a body defined by a length (l), which can be the longest dimension of any side of the shaped abrasive particle, a width (w) defined as a longest dimension of the shaped abrasive particle through a midpoint of the shaped abrasive particle, and a thickness (t) defined as the shortest dimension of the shaped abrasive particle extending in a direction perpendicular to the length and width. In specific instances, the length can be greater than or equal to the width. Moreover, the width can be greater than or equal to the thickness.

Additionally, the body of the shaped abrasive particles can have particular two-dimensional shapes. For example, the body can have a two-dimensional shape as viewed in a plane define by the length and width having a polygonal shape, elipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

Figure 6B:
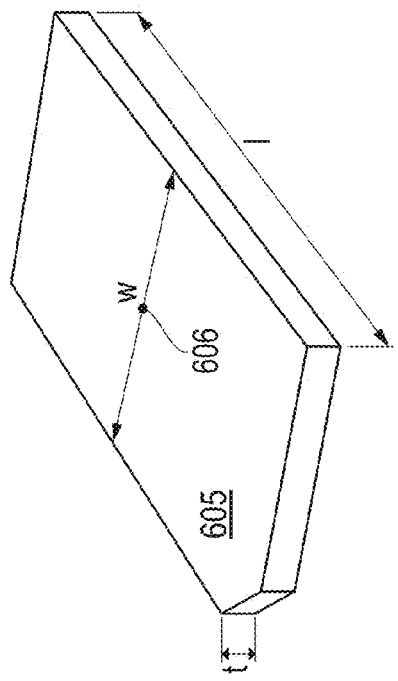
FIG. 6A through 6C include perspective view illustrations of shaped abrasive particles in accordance with an embodiment.
Figure 6C:
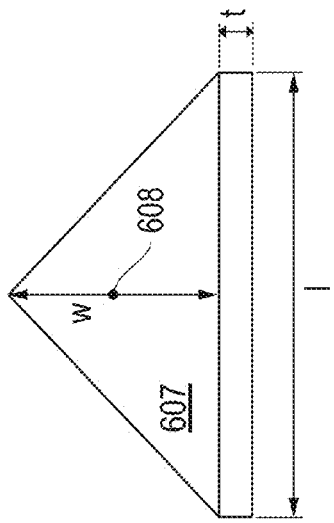
Figure 6A:
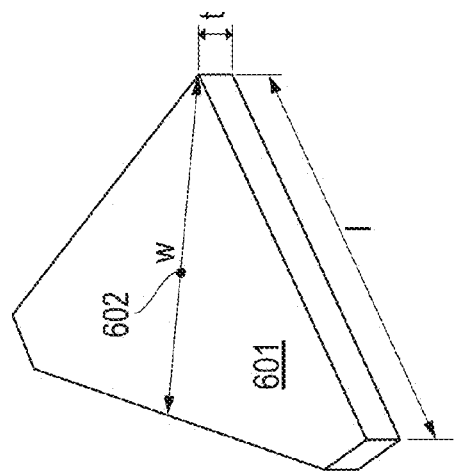

FIG. 6A includes a perspective view illustration of a shaped abrasive particle in accordance with an embodiment. As illustrated, the shaped abrasive particle can have a corner-truncated triangular shape. In particular, the body 601 of the shaped abrasive particle can have a length (l), a width (w) extending through a midpoint 602 of the body 601, and a thickness (t). In accordance with an embodiment, the body 601 can have a primary aspect ratio defined as a ratio of length:width. In certain instances, the primary aspect ratio of the body 601 can be at least about 1.2:1, such as at least about 1.5:1, at least about 2:1, at least about 3:1, or even at least about 4:1. Still, the primary aspect ratio may be not greater than about 100:1. It will be appreciated that the primary aspect ratio of the body 601 may be within a range between any of the minimum and maximum ratios noted above.

Furthermore, the body 601 can have a secondary aspect ratio defined by a ratio of length:thickness. In certain instances, the secondary aspect ratio of the body 601 may be at least about 1.2:1, such as at least about 1.5:1, at least about 2:1, at least about 3:1, at least about 4:1, at least about 5:1, or even at least about 10:1. Still, in at least one non-limiting embodiment, the body 601 can have a secondary aspect ratio that is not greater than about 100:1. It will be appreciated that the secondary aspect ratio may be within a range between any of the minimum and maximum ratios provided above.

Furthermore, the shaped abrasive particles of the embodiments herein can have a tertiary aspect ratio defined by a ratio of the width:thickness. In certain instances, the tertiary aspect ratio of the body 601 may be at least about 1.2:1, such as at least about 1.5:1, at least about 2:1, at least about 3:1, at least about 4:1, at least about 5:1, or even at least about 10:1. Still, in at least one non-limiting embodiment, the body 601 can have a tertiary aspect ratio that is not greater than about 100:1.

It will be appreciated that the tertiary aspect ratio may be within a range between any of the minimum and maximum ratios provided above.

FIG. 6B includes a perspective view illustration of a shaped abrasive particle formed in accordance with an embodiment. Notably, the body 605 can have a generally quadrilateral shape. However, in one particular embodiment, the body 605 may be a corner truncated quadrilateral, and more particularly a corner truncated parallelagram or trapazoidal shape. In particular, the body 605 of the shaped abrasive particle can have a length (l), a width (w) extending through a midpoint 606 of the body 605, and a thickness (t). The body 605 can have the any of the features of any shaped abrasive particle described in the embodiments herein.

FIG. 6C includes a perspective view illustration of a shaped abrasive particle formed in accordance with an embodiment. Notably, the body 607 can have a generally polygonal shape, and more particularly a triangular two-dimensional shape as viewed in a plane defined by the length (l) and width (w). In particular, the body 607 of the shaped abrasive particle can have a length (l), a width (w) extending through a midpoint 608 of the body 607, and a thickness (t). The body 607 can have the any of the features of any shaped abrasive particle described in the embodiments herein.

Figure 7:
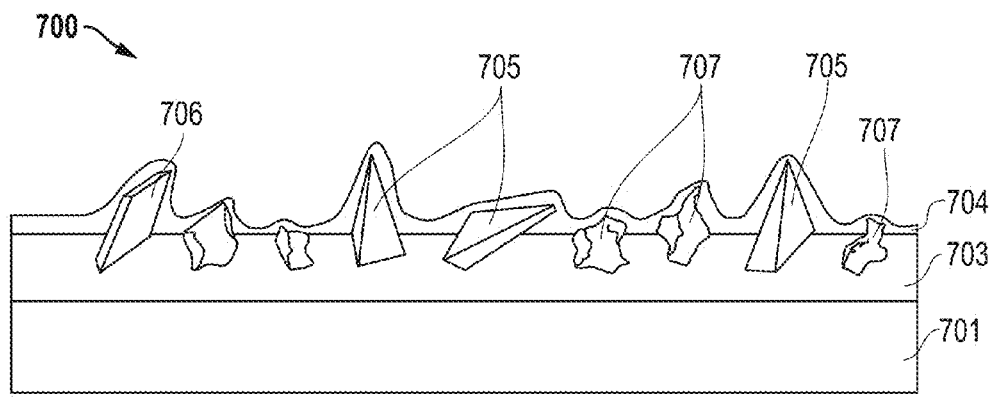
FIG. 7 includes a coated abrasive including shaped abrasive particles according to an embodiment.

FIG. 7 includes a cross-sectional illustration of a coated abrasive article incorporating the abrasive particulate material in accordance with an embodiment. As illustrated, the coated abrasive 700 can include a substrate 701 and a make coat 703 overlying a surface of the substrate 701. The coated abrasive 700 can further include abrasive particulate material 706. The abrasive particulate material 706 can include a first type of particles including shaped abrasive particles 705 and a second type of abrasive particulate material 707 in the form of diluent abrasive particles. The diluent abrasive particles can have a random shape, and may not necessarily be shaped abrasive particles. The coated abrasive 700 may further include size coat 704 overlying and bonded to the abrasive particulate materials 705, 706, 707, and the make coat 704.

According to one embodiment, the substrate 701 can include an organic material, inorganic material, and a combination thereof. In certain instances, the substrate 701 can include a woven material. However, the substrate 701 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 703 can be applied to the surface of the substrate 701 in a single process, or alternatively, the abrasive particulate materials 705, 706, 707 can be combined with a make coat 703 material and applied as a mixture to the surface of the substrate 701. Suitable materials of the make coat 703 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 703 can include a polyester resin. The coated substrate can then be heated in order to cure the resin and the abrasive particulate material to the substrate. In general, the coated substrate 701 can be heated to a temperature of between about 100° C. to less than about 250° C. during this curing process.

The abrasive particulate material 706 can include shaped abrasive particles according to embodiments herein. In particular instances, the abrasive particulate material 706 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 700 can include a shaped abrasive particle 705 having a generally triangular two-dimensional shape.

The other type of abrasive particles 707 can be diluent particles different than the shaped abrasive particles 705. For example, the diluent particles can differ from the shaped abrasive particles 705 in composition, two-dimensional shape, three-dimensional shape, size, and a combination thereof. For example, the abrasive particles 707 can represent conventional, crushed abrasive grit having random shapes. The abrasive particles 707 may have a median particle size less than the median particle size of the shaped abrasive particles 705.

After sufficiently forming the make coat 703 with the abrasive particulate material 706, the size coat 704 can be formed to overlie and bond the abrasive particulate material 706 in place. The size coat 704 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 8:
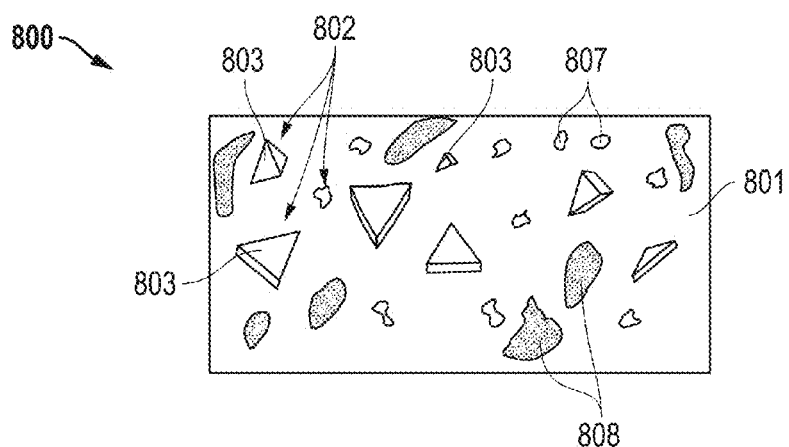
FIG. 8 includes a bonded abrasive including shaped abrasive particles according to an embodiment.

FIG. 8 includes an illustration of a bonded abrasive article incorporating the abrasive particulate material in accordance with an embodiment. As illustrated, the bonded abrasive 800 can include a bond material 801, abrasive particulate material 802 contained in the bond material, and porosity 808 within the bond material 801. In particular instances, the bond material 801 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

In some instances, the abrasive particulate material 802 of the bonded abrasive 800 can include shaped abrasive particles 803. In particular instances, the shaped abrasive particles 803 can be different types of particles, which can differ from each other in composition, two-dimensional shape, three-dimensional shape, size, and a combination thereof as described in the embodiments herein. Alternatively, the bonded abrasive article can include a single type of shaped abrasive particle.

The bonded abrasive 800 can include a type of abrasive particulate material 807 representing diluent abrasive particles, which can differ from the shaped abrasive particles 803 in composition, two-dimensional shape, three-dimensional shape, size, and a combination thereof.

The porosity 808 of the bonded abrasive 800 can be open porosity, closed porosity, and a combination thereof. The porosity 808 may be present in a majority amount (vol %) based on the total volume of the body of the bonded abrasive 800. Alternatively, the porosity 808 can be present in a minor amount (vol %) based on the total volume of the body of the bonded abrasive 800. The bond material 801 may be present in a majority amount (vol %) based on the total volume of the body of the bonded abrasive 800. Alternatively, the bond material 801 can be present in a minor amount (vol %) based on the total volume of the body of the bonded abrasive 800. Additionally, abrasive particulate material 802 can be present in a majority amount (vol %) based on the total volume of the body of the bonded abrasive 800. Alternatively, the abrasive particulate material 802 can be present in a minor amount (vol %) based on the total volume of the body of the bonded abrasive 800.

EXAMPLES

Example 1

Figure 9B:
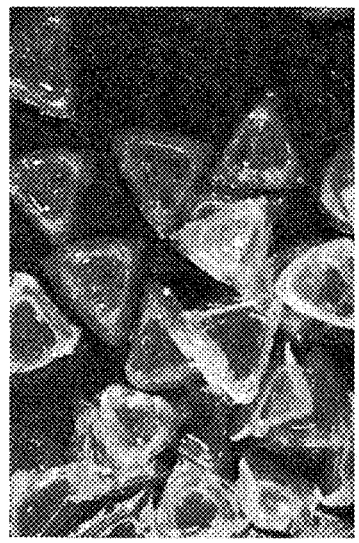
FIGS. 9A and 9B include pictures of precursor shaped abrasive particles formed according to a screen-printing process.
Figure 9A:

A first sample (CS1) of precursor shaped abrasive particles are formed using a screen printing process as detailed below. A mixture, which is in the form of a gel, is initially made including 35-40 wt % boehmite commercially available as unseeded Disperal from Sasol Corporation. The mixture also includes water, nitric acid, and organic material. The mixture is extruded through a die opening under a pressure of 8-10 psi and through a screen having equilateral triangular-shaped openings having a length of a side of 2-2.5 mm. The openings have a depth of approximately 0.8 mm. The screen and belt are moved at a rate of approximately 10 cm/sec. Notably, within the release zone, the belt defines a release radius of approximately 8 inches. Precursor shaped abrasive particles formed through the process are illustrated in FIGS. 9A and 9B.

Example 2

Figure 10B:
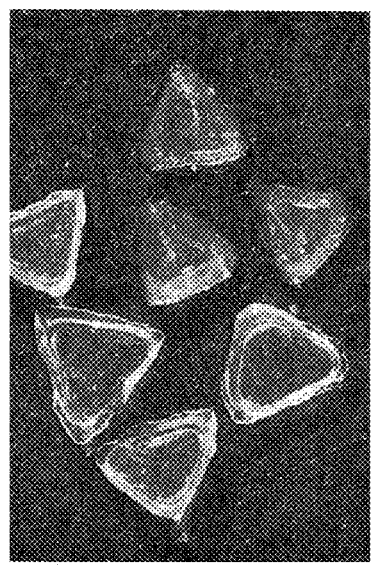
FIGS. 10A and 10B include a pictures of precursor shaped abrasive particles formed according to a screen-printing process of an embodiment herein.
Figure 10A:
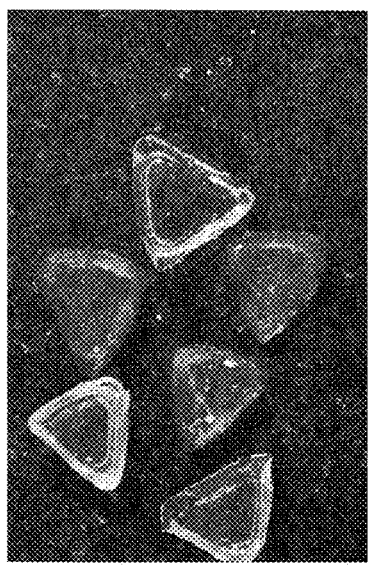

A second sample (S1) of precursor shaped abrasive particles are formed through a screen printing process according to an embodiment herein. Notably, the process to produce sample S1 is the same as in Example 1, except that the belt release radius is reduced to approximately 1.7 inches. The precursor (i.e., not heat treated) shaped abrasive particles of sample S1 are illustrated in FIGS. 10A and 10B. In a comparison of the precursor shaped abrasive particles of samples CS1 and S1, it is evident that the particles formed through the process of Example 2 (S1) had less sloping of the sidewalls, less of the mixture was left in the screen openings, and the particles of S1 demonstrated improved "shape correctness" over the particles of sample CS1. The term "shape correctness" is an estimation of the accuracy of replication in the shape of the precursor shaped abrasive particles compared to the shape of the openings.

The present application represents a departure from the state of the art. While the industry has recognized that shaped abrasive particles may be formed through processes such as molding and screen printing, the processes of the embodiments herein are distinct from such processes. Notably, the embodiments herein include a combination of process features facilitating the formation of batches of shaped abrasive particle having particular features. Moreover, the shaped abrasive particles of the embodiments herein can have a particular combination of features distinct from other particles including, but not limited to, aspect ratio, composition, additives, two-dimensional shape, three-dimensional shape, and a combination thereof. And in fact, such compositions may facilitate improved grinding performance in the context of fixed abrasives, such as bonded abrasives or coated abrasives.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A method of forming a shaped abrasive particle comprising:
    extruding a mixture into an opening in a screen within an application zone; and
    translating the screen and belt to a release zone and separating the screen and belt to form a precursor shaped abrasive particle on the belt, wherein the screen and belt are separated at a release angle of at least about 15° and not greater than about 45°, wherein the release angle is defined as an angle between a surface of the screen and a surface of the belt; and
    further comprising a knife edge integrally formed with a die and configured to engage the mixture upon extrusion from a die opening, wherein the knife edge comprises an erodible surface.

2. The method of claim 1, wherein the release angle is at least about 18°.

3. The method of claim 1, wherein the release angle is not greater than about 42°.

4. The method of claim 1, wherein the release angle is defined as an angle between a lower surface of the screen and an upper surface of the belt.

5. The method of claim 1, further comprising a radius of release of not greater than about 6 inches.

6. The method of claim 1, further comprising a radius of release of at least about 0.2 inches.

7. The method of claim 1, further comprising moving the belt over a directional adapter coupled to a surface of the belt, wherein the directional adapter is configured to adapt at least one of the release angle and a radius of release.

8. The method of claim 1, further comprising moving the belt over a table within the application zone, wherein the belt directly contacts a surface of the table within the application zone, and wherein the table is movable between a first position and a second position to change at least one of a vertical position of the belt, a radius of release, and the release angle.

9. The method of claim 1, wherein the mixture comprises a storage modulus of at least about $1 \times 10^4$ Pa, wherein the mixture has a storage modulus of not greater than about $1 \times 10^7$ Pa.

10. The method of claim 1, wherein the knife edge abuts a portion of the screen during extruding, and wherein the knife edge comprises a contact surface having a width of at least about 0.01 mm and not greater than about 20 mm.

11. The method of claim 1, wherein the knife edge comprises a material different than the die.

12. A method of forming a shaped abrasive particle comprising:
    extruding a mixture through a die opening of a die and into an opening of a screen underlying the die opening within an application zone, and
    forcing at least a portion of the mixture into the opening while translating the screen under a knife edge integrally formed with a surface of the die, wherein the knife edge is configured to contact a surface underlying the die and wear away until forces between the knife edge and the surface are balanced.

13. The method of claim 12, wherein the screen is separated from an underlying belt at a release angle within a range between about 15° and about 45° within a release zone, wherein the release angle is defined as an angle between a surface of the screen and a surface of the belt.

14. The method of claim 12, further comprising a radius of release of not greater than about 6 inches.

* * * * *